United States Patent
Platzer et al.

(10) Patent No.: US 9,568,056 B2
(45) Date of Patent: Feb. 14, 2017

(54) ELECTROMECHANICALLY ACTUATED VEHICLE BRAKE HAVING AN IMPROVED PISTON

(75) Inventors: Rudolf Platzer, Frankfurt (DE); Martin Semsch, Maibach-Butzbach (DE); Hilmar Teitge, Frankfurt (DE); Antje Greif-Teitge, legal representative, Frankfurt (DE); Emma Sophie Teitge, legal representative, Frankfurt (DE); Achim Reich, Hofheim (DE); Thomas Winkler, Mainz (DE); Matthias Würz, Oberursel (DE); Michel Stoltze, Seligenstadt (DE)

(73) Assignee: Continental Teves AG & Co. oHG, Frankfurt (DE)

( * ) Notice: Subject to any disclaimer, the term of this patent is extended or adjusted under 35 U.S.C. 154(b) by 51 days.

(21) Appl. No.: 13/884,646

(22) PCT Filed: Oct. 4, 2011

(86) PCT No.: PCT/EP2011/067336
§ 371 (c)(1),
(2), (4) Date: Aug. 29, 2013

(87) PCT Pub. No.: WO2012/065784
PCT Pub. Date: May 24, 2012

(65) Prior Publication Data
US 2013/0327606 A1 Dec. 12, 2013

(30) Foreign Application Priority Data

Nov. 17, 2010 (DE) .......... 10 2010 044 029
Dec. 9, 2010 (DE) .......... 10 2010 062 765
Aug. 15, 2011 (DE) .......... 10 2011 080 940

(51) Int. Cl.
*B60T 11/00* (2006.01)
*F16D 65/18* (2006.01)
(Continued)

(52) U.S. Cl.
CPC .......... *F16D 65/18* (2013.01); *F16D 65/0006* (2013.01); *F16D 2121/04* (2013.01);
(Continued)

(58) Field of Classification Search
CPC .. F16D 65/18; F16D 65/0006; F16D 2121/24; F16D 2121/04; F16D 2123/00; F16D 2125/06; F16D 2125/40
(Continued)

(56) References Cited

U.S. PATENT DOCUMENTS 3,888,449 A * 6/1975 Jablonski et al. ....... 267/140.11
4,660,685 A * 4/1987 Thacker et al. ........... 188/73.37
(Continued)

FOREIGN PATENT DOCUMENTS

DE 102 18 112 A1 11/2003
DE 102 18 112 B4 5/2007
(Continued)

OTHER PUBLICATIONS

International Search Report for PCT/EP2011/067336 mailed Jan. 26, 2012.
(Continued)

*Primary Examiner* — Pamela Rodriguez
(74) *Attorney, Agent, or Firm* — RatnerPrestia

(57) ABSTRACT

An electromechanically actuated vehicle brake having a hydraulically and/or mechanically actuated piston and at least one spindle-nut-arrangement. The invention further relates to a piston. To prevent unnecessary play, vibration, noises between adjacent components it is proposed that in the area of a coupling between the spindle-nut-arrangement
(Continued)

and the piston at least one compensating element be provided, which prevents unwanted component oscillations.

18 Claims, 9 Drawing Sheets

(51) Int. Cl.
*F16D 65/00* (2006.01)
*F16D 121/04* (2012.01)
*F16D 121/24* (2012.01)
*F16D 123/00* (2012.01)
*F16D 125/06* (2012.01)
*F16D 125/40* (2012.01)

(52) U.S. Cl.
CPC ...... *F16D 2121/24* (2013.01); *F16D 2123/00* (2013.01); *F16D 2125/06* (2013.01); *F16D 2125/40* (2013.01)

(58) Field of Classification Search
USPC .................. 188/368, 206 R, 73.35, 73.36, 73.37,188/73.1; 92/136, 165 PR, 204, 207
See application file for complete search history.

(56) References Cited

U.S. PATENT DOCUMENTS

| 6,382,367 | B1 * | 5/2002 | Varzescu et al. | 188/72.7 |
| 8,286,760 | B2 * | 10/2012 | Geissler et al. | 188/73.1 |
| 2003/0006357 | A1 * | 1/2003 | Kaiser et al. | 248/550 |
| 2004/0149532 | A1 * | 8/2004 | Beigang | 188/379 |
| 2009/0114490 | A1 * | 5/2009 | Picot | 188/73.37 |

FOREIGN PATENT DOCUMENTS

| DE | 10 2009 012 016 A1 | 9/2010 | |
| DE | 102009012016 | * 9/2010 | |
| WO | WO 97/30294 | 8/1997 | |
| WO | WO 9730294 A1 * | 8/1997 | ............. F16D 55/16 |

OTHER PUBLICATIONS

Chinese Office Action mailed Dec. 24, 2014 for Chinese Patent Application No. 201180055574.3.

* cited by examiner

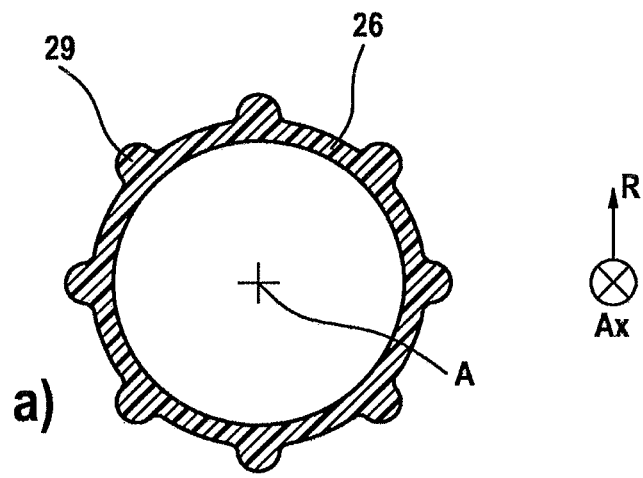
Fig. 9
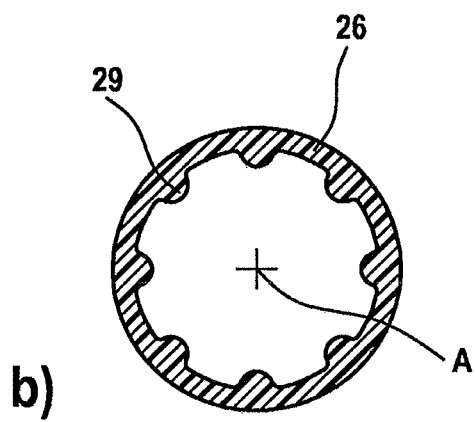

ELECTROMECHANICALLY ACTUATED VEHICLE BRAKE HAVING AN IMPROVED PISTON

CROSS REFERENCE TO RELATED APPLICATIONS

This application is the U.S. National Phase Application of PCT/EP2011/067336, filed Oct. 4, 2011, which claims priority to German Patent Application Nos. 10 2010 044 029.9, filed. Nov. 17, 2010, 10 2010 062 765.8, filed Dec. 9, 2010 and 10 2011 080 940.6, filed Aug. 15, 2011, the contents of such applications being incorporated by reference herein.

BACKGROUND OF THE INVENTION

Electromechanically actuated vehicle brakes are fundamentally known. Aimed at providing an efficient wheel brake of compact and lightweight construction, an electromechanical actuator comprises an electric motor and a multistage transmission, which serves to gear down an electromotive rotational drive movement from an electric motor of relatively lightweight and compact design, and to convert this geared-down rotational drive movement into the required translational movement in order to generate braking forces. To this end, the transmission comprises a spindle-nut-arrangement, which translates the rotational movement into a translational movement. For this purpose, the electromechanical actuator is attached on a single side to a stub axle-shaped brake housing, which accommodates one or more translationally displaceable pistons on the actuator side. The brake housing is arranged so that it is displaceable in relation to a carrier fixed to the vehicle. Utilizing the reaction forces whilst performing a relative displacement of the brake housing means that a single electromechanical actuator of low weight is in principle sufficient to apply brake linings arranged on both sides of a brake disk to friction surfaces of the brake disk by means of opposing translational movements, and with the required application force of approximately 1800 Newton.

It is often not fully appreciated in this context that for various reasons (application forces, temperature, fouling, operating reliability, weight, wear, ventilation capacity and many other influencing variables of a usual load spectrum) the demands placed on an electrically and hydraulically actuated motor vehicle brake are exceptional in the extreme and also subject to constraints in terms of the acceptable costs. In this context it must also be remembered, in particular, that a wheel brake cannot be regarded as a completely inelastic, rigid construction, but that when subjected to high stress-loading an elastic material behavior is inevitable, that relative changes in the position of adjacent components in relation to one another have to be catered for, and that modified, possibly wider geometrical and positional tolerances may be necessary.

In the case of so-called combined hydraulically and electromechanically actuated vehicle brakes performing an electromechanical parking brake function there is the further special feature that energy for actuation of the brake may be generated both electromechanically, hydraulically, or by a combination of these methods. For this reason, in a force flux between the spindle-nut-arrangement and the piston a releasable coupling is provided, which allows a purely hydraulic actuation without damaging or having a negative reactive effect on the spindle-nut-arrangement.

Known electromechanical parking brakes may have the following problems. Under unfavorable conditions in which the actuator travel is extended (thermal expansion, worn friction pairings or the like), rattling noises can be generated when running over rough roads. It has been determined through analysis that some of the causes of such rattling noises are to be sought primarily in the area of the components of the electromechanical actuators. This is because the dimensioning of inevitable geometrical and positional tolerances, clearance fits, particularly of a movement in a radial direction between components of the electromechanical actuators on the one hand and the piston on the other, are a source of these noise problems. A further finding was that the effects prompting complaints result in particular from oscillation phenomena in the area of a coupling between the spindle-nut-arrangement and the piston.

SUMMARY OF THE INVENTION

An aspect of the present invention, therefore, provides an improved solution affording an especially quiet, electromechanically actuated vehicle brake.

To solve the problem, a vehicle brake is proposed, wherein according to an aspect of the invention a compensating element, which serves effectively to eliminate movements, oscillations or noises resulting from the area of the coupling, is provided as damping means in the area of a coupling between the spindle-nut-arrangement and the piston. Oscillations or (angular) mis-alignments which can arise due to the dead weight, state of wear and/or placing of adjacent components are countered. Here, in principle, the compensating element may be provided between all feasible combinations of components adjacent to one another, which are arranged in the force flux of a friction brake, without departing from the basic idea of the invention. The primary intention, however, is to isolate any knocking noise in the area of a friction cone (coupling). The invention furthermore extends to a piston for use in a motor vehicle brake device, which is intended to accommodate at least one compensating element. A side effect of the invention is to assist the adjustment of the required clearance.

BRIEF DESCRIPTION OF THE DRAWINGS

Further details of the invention are set forth in the dependent claims together with the description referring to the drawing, in which:

FIGS. 2-9 show various exemplary embodiments of a piston unit having a compensating element as damping means.

DETAILED DESCRIPTION OF THE INVENTION

Figure 1:
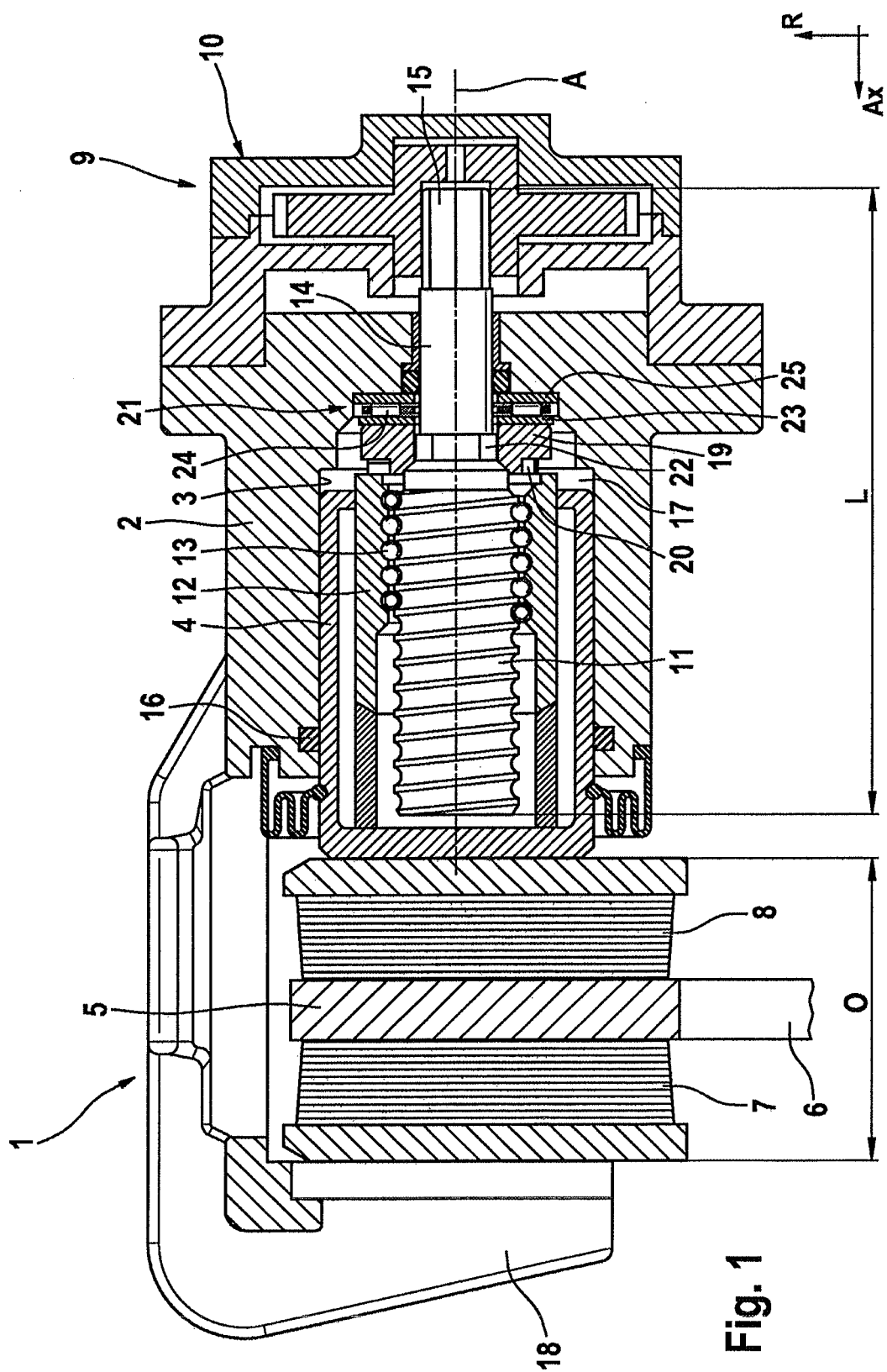
FIG. 1 shows an electromechanically actuated vehicle brake embodied as a combined vehicle brake.
Figure 2:
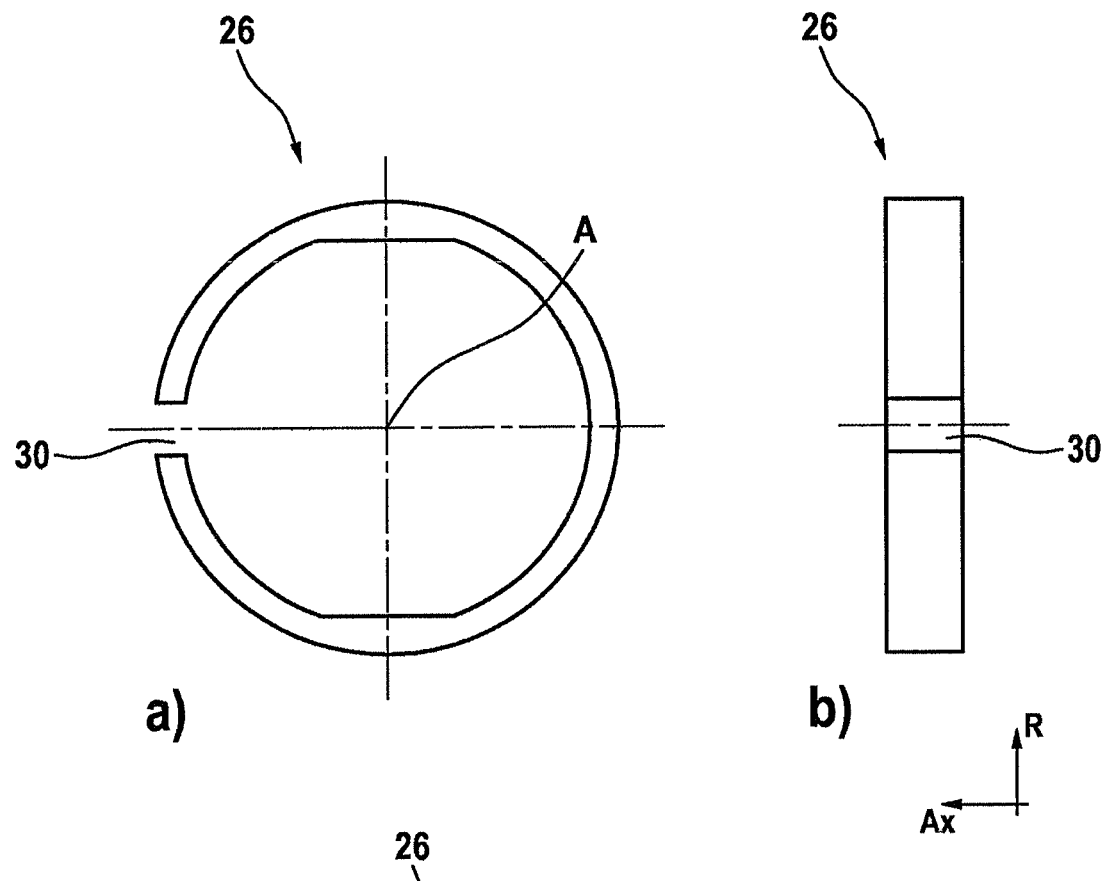
Figure 2:
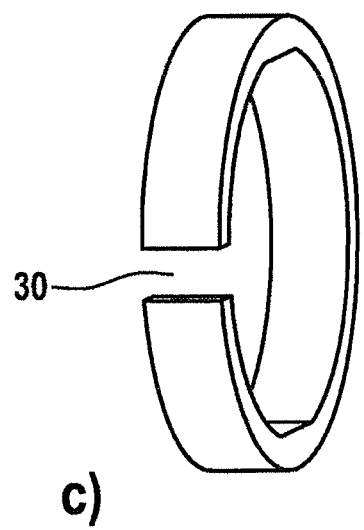
Figure 3:
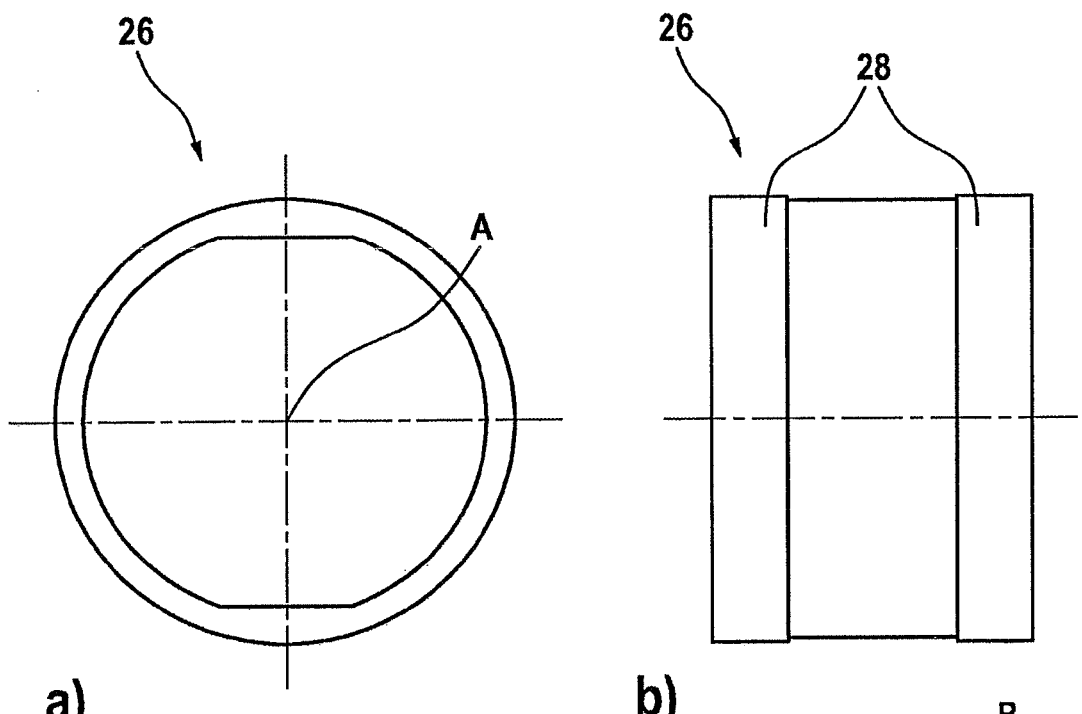
Figure 3:
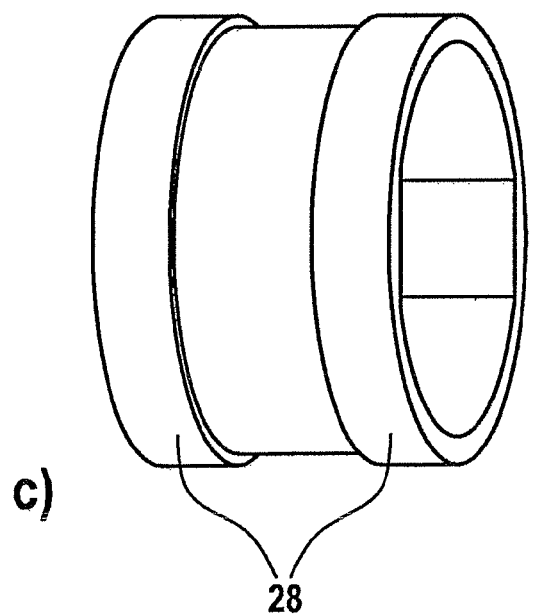
Figure 4:
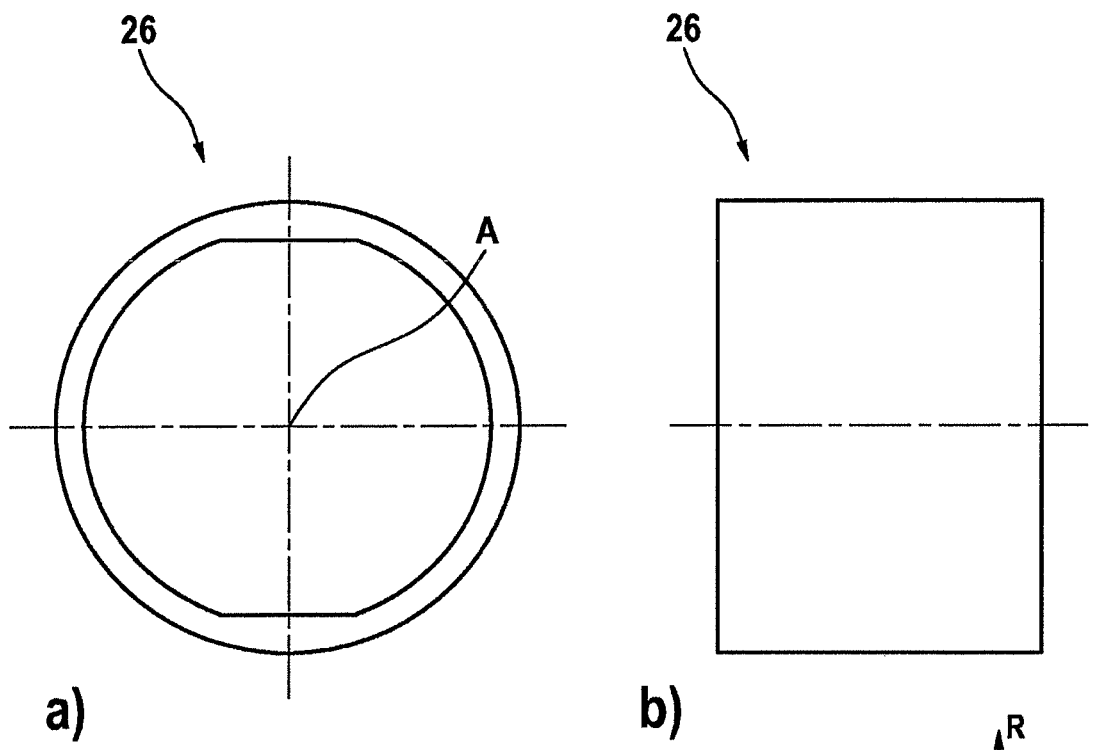
Figure 4:
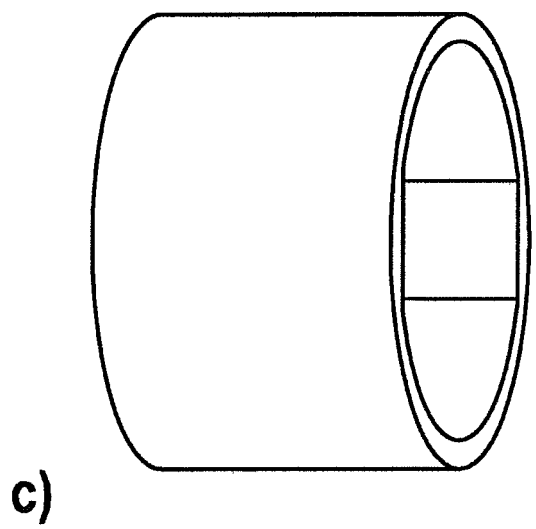
Figure 5:
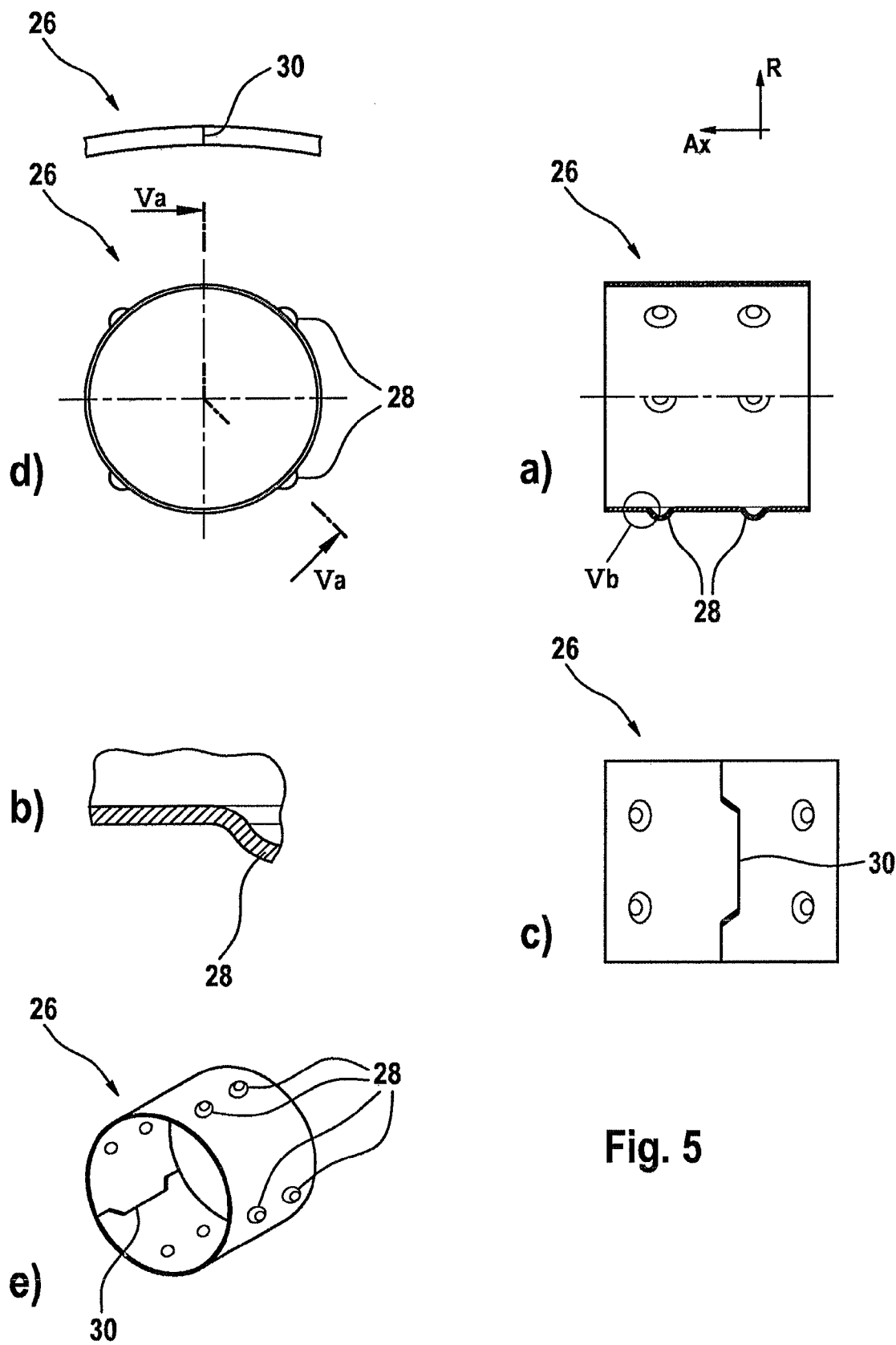
Figure 6:
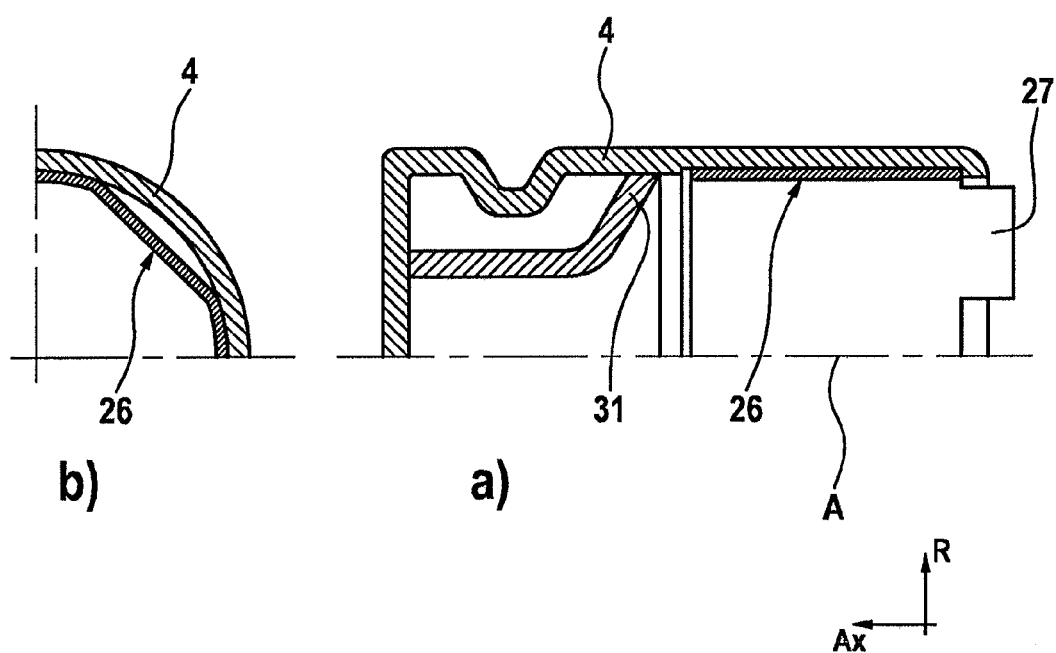
Figure 7:
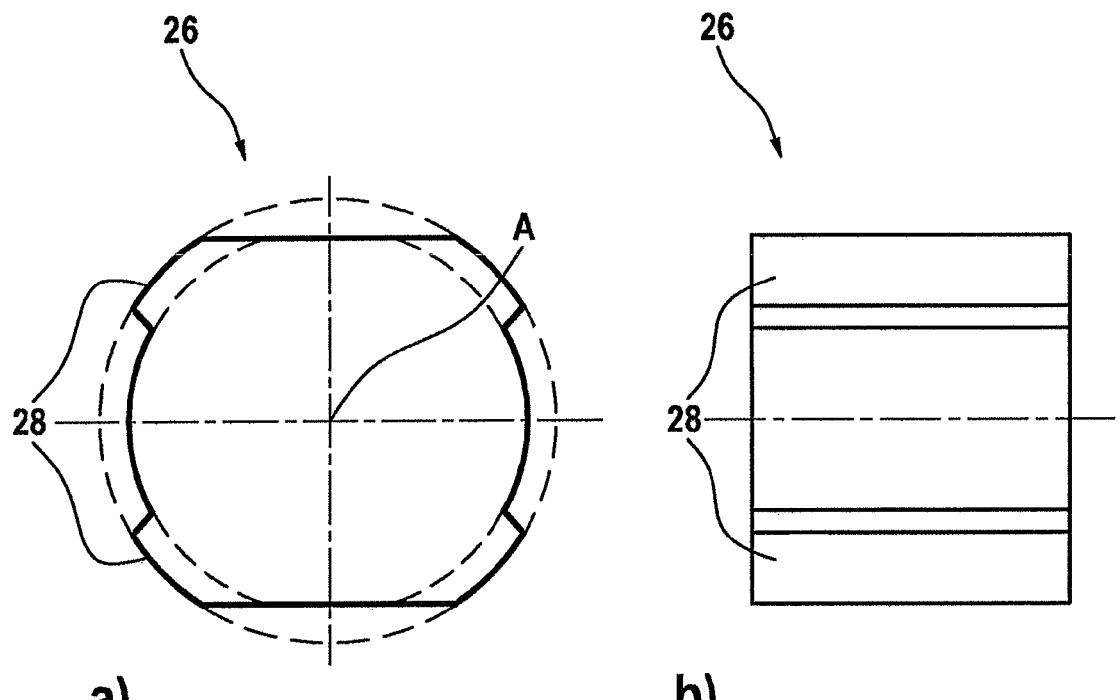
Figure 7:
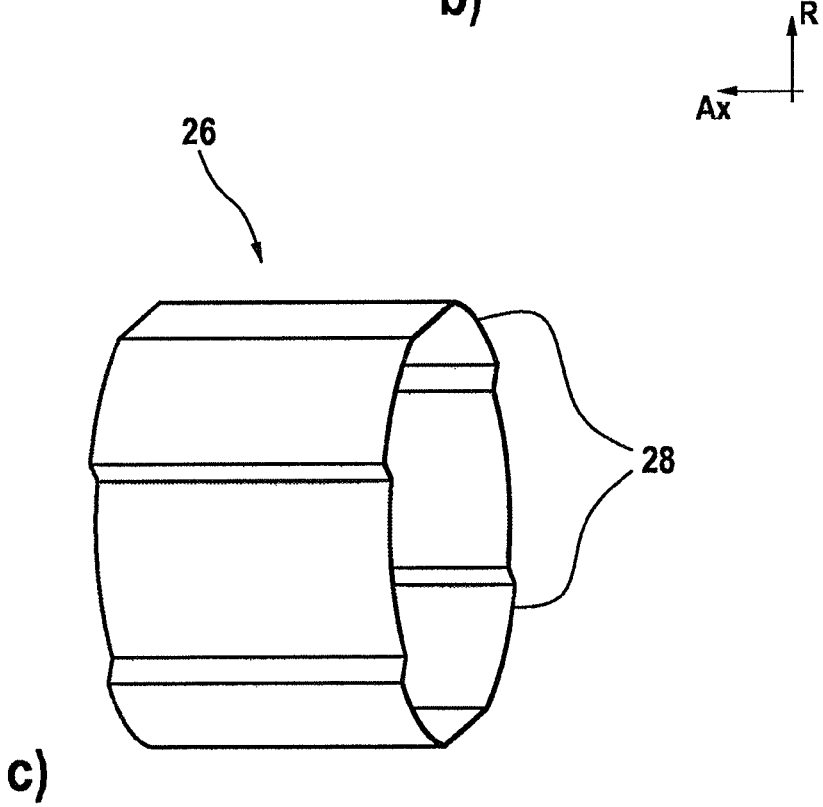
Figure 8:
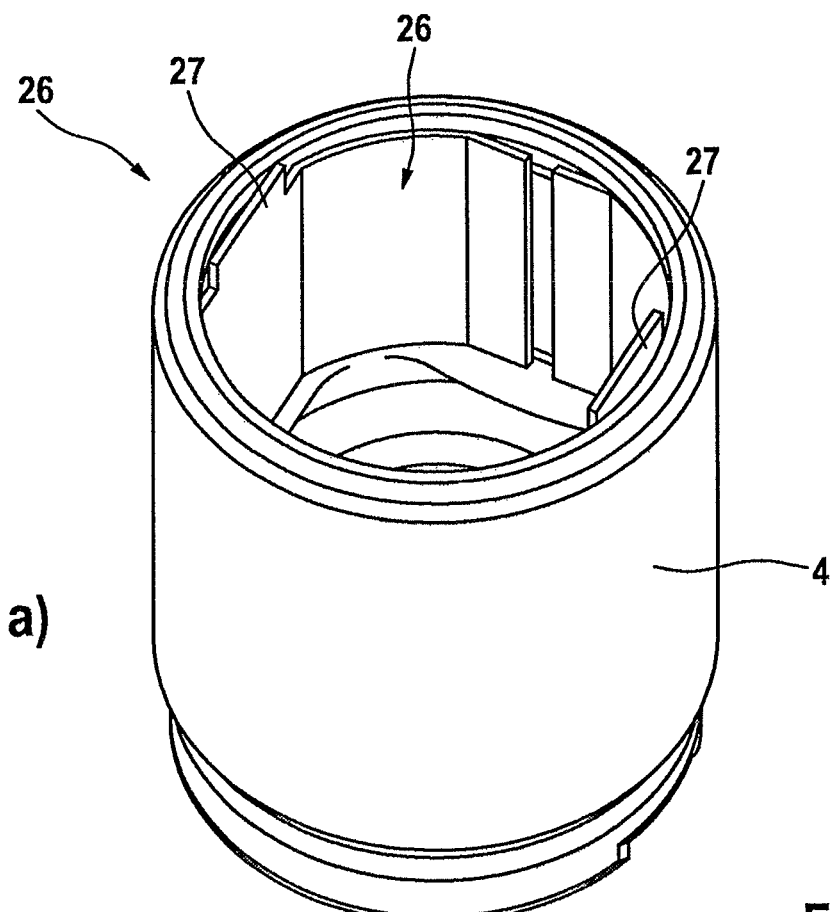
Figure 8:
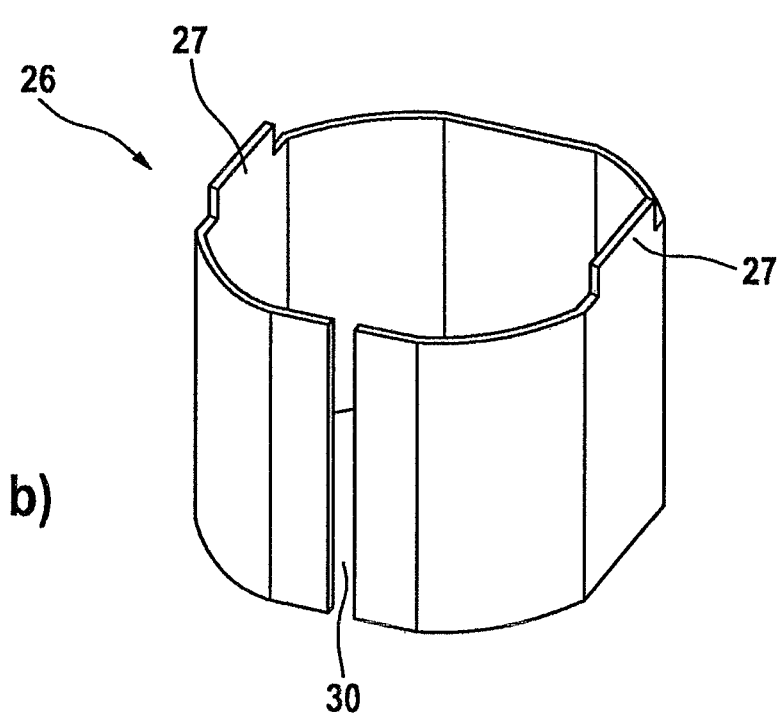

FIG. 1 represents a hydraulically and electromechanically actuated vehicle brake 1 showing the main components. This comprises a hydraulically actuated service brake function and an electromechanically actuated parking brake function arresting the vehicle in the absence of a current. In the preferred example, the vehicle brake 1 is designed as a floating-caliper disk brake having a piston 4, received inside a cylindrical, possibly stepped piston bore 3 so that it is displaceable along an axis A, here omitting details of a carrier fixed to the vehicle. The housing 2 (brake caliper) is to the greatest possible extent of a C or U-shaped design, in order to grip around a friction ring 5 of a brake disk 6, and associated friction surfaces and brake linings 7,8.

Since the hydraulic actuating mode on the basis of the hydraulic piston 4 is sufficiently familiar to a person skilled in the art of brakes, a more detailed explanation will be dispensed with.

An electromechanical actuator 9 comprising at least one electric motor (not shown) and a transmission module 10 serves for an electromechanically performed parking brake function, or in the case of the entirely electromechanically actuated vehicle brakes for performing all braking functions, parts of the transmission being arranged in the housing 2, and serving to a rotational rotary drive movement of the electric motor, into a translational sliding movement of the piston 4 along its axis A, and to allow a parking brake to act in the absence of a current.

In this context a further possibility is to integrate a preferably two-stage, purely rotationally actuated transmission, sensors and any electronic control unit in a packaged, pre-assembled drive module, which can be fitted to the housing 2 as a packaged unit.

A motion transducer (rotational rotary drive movement/ translational piston movement) of the transmission is to the greatest possible extent situated in the housing 2 and is substantially formed by a rotationally driven threaded spindle 11 and by a threaded nut 12, which is arranged largely rotationally fixed in the housing 2 and which impinges upon the piston 4. In a preferred embodiment, the threaded nut 12 is coupled to the piston 4 in such a way so that both an advance movement and a return movement can be transmitted to the piston 4. In other words, provision can be made for specifically electromechanical adjustment of a clearance following a brake actuation. Situated between the threaded spindle 11 and the threaded nut 12 for the purpose of reducing friction are rolling elements 13, which are preferably of spherical design, it being possible to substitute spring means for a recirculating ball mechanism. The threaded spindle 11 comprises a rotationally fixed shaft 14, which with a driver portion 15 projects out of the housing 2, and which is driven by the electric motor by way of an interposed, preferably two-stage reduction gear. In the case of hydraulically combined brakes, means are furthermore provided for the sealing 16 of a pressure chamber 17.

The threaded spindle 11 is accommodated together with the piston 4 in the piston bore 3 of the housing 2. This requires a precise introduction and insertion assembly operation. Since a length 1 of the threaded spindle 11 is designed to be greater than an aperture o of the housing, so-called stub-axle fingers 18 preventing a direct coaxial introduction of the threaded spindle module, fitting requires a defined swiveling movement with predefined kinematics. After fitting in the housing 2, the threaded spindle module is supported in the axial direction A by a stop disk 19 resting on the threaded spindle 11, and also supported on the housing 2 by a multipart axial bearing 21.

In reverse rotational driving of the threaded spindle 11 in the release direction, an abrupt impact between a base surface of the threaded nut 12 and a flat radial stop of the threaded spindle 11 might result in self-locking between the threaded spindle 11 and the threaded nut 12, possibly giving rise to a friction torque between the components involved that could not be released by the electric motor. For this reason, the pre-assembled spindle module comprises multiple parts, that is to say a stop disk 19 having a tangential stop 20 as stop means for an associated, tangentially placed stop face of the threaded nut 12. For this purpose, for adjustment of the rear stop in a predefined angular position in relation to the threaded spindle 11, the stop disk 19 is pushed torsionally secure and axially onto a wrench face 22, polygon, polygonal profile or the like of the threaded spindle 11 so that it is rotationally fixed. The threaded spindle module further comprises main constituent parts of the axial bearing 21, that is to say an axial bearing disk 23, rolling elements 24 which are assembled, in particular, in a ring, or alternatively a slide bearing disk, and an axial bearing disk 25 arranged on the housing side. It will be obvious that said components are threaded axially onto the threaded spindle 1 in precisely the same way as the stop disk 19, the components of the axial bearing 21 obviously being freely rotatable relative to the threaded spindle 11, in order to fulfill the bearing function.

The embodiments according to FIGS. 2-9 are described below. The invention accordingly relates primarily to a piston 4 for use in a motor vehicle brake. To prevent excessive, unwanted play, vibration, noises between adjacent components or the like, the invention in essence proposes that at least one compensating element 26, which prevents or at least reduces unwanted component oscillations be provided in the area of a coupling between the spindle-nut-arrangement and the piston 4. The compensating element acts in radial direction R. The compensating element 26 may have elastic spring characteristics and be of elastically pretensioned design, so that play is reduced to some extent automatically. Accordingly, the compensating element 26 is arranged elastically as a separate intermediate element between the adjacent components. Such a spacer serves to prevent the components coming into direct contact. A designed-in natural frequency of the compensating element 26—also in respect of any higher-order resonances— obviously has a sufficient interval from the excitation frequency. It is particularly advantageous if an analysis of the entire assembled system is performed with a view to tuning of the natural frequency, so that the desired result is obtained. This procedure can even be used to modulate the operating noise of an actuator as desired.

As can be seen in detail from the figures, a recommended, preferred exemplary embodiment of a compensating element 26 is in principle embodied as an additionally and separately inserted insert for a piston 4. This affords a construction that is especially easy to fit and reliable in operation. The compensating element 26 can be fitted in a mount inside a radially inner wall of the piston immediately after manufacturing of the piston 4. The mount may have one or more steps, undercuts or the like facing radially inwards, which helps to secure the position through positive interlock, particularly in an axial direction. This also includes an edge portion, for example, which is provided offset radially inwards from the wall.

The compensating element 26 may be embodied as a spring element having a cylindrical, annular or bushing-shaped design. The compensating element 26 preferably has an axially oriented overlap 30, which may be positively interlocking so as thereby to allow a radially directed, elastic spring action, in order to provide a frictional fixing of the compensating element inside the piston. Consequently, it is possible to design the compensating element 26 as an elastic, slit ring/bushing and to deform this elastically for the purpose of fitting, and then to place it radially inside a mount, the elastic deformation being at least partially reversed after fitting. The compensating element 26 is fixed in the piston 4 by the elastic recovery of the compensating element 26, and by the elastic pretensioning brought about inside the mount. This affords a pre-assembled piston unit, which in principle may also comprise further components such as, in particular, components of the spindle-nut unit, in order to facilitate subsequent assembly operations on the vehicle brake/brake caliper. It will be obvious that further positively interlocking and/or frictional fixing features may be provided in conjunction with one another.

With the aid of an integrally formed-on or an additionally provided torsion safeguard, the compensating element 26 may be arranged rotationally fixed in a mount of the piston 4. If the piston 4 in turn is received torsionally secured in the piston bore, the threaded nut may to a certain extent be indirectly secured against torsion. In principle, instead of a fixed torsion safeguard, a torque limitation may also be feasible, so that a safety coupling function is incorporated instead of a torsion safeguard function. In this context it may be that the compensating element 26 has radially oriented profiling and/or a radially oriented texturing such as, in particular, multiple projections or cams, and that the profiling emerging from the compensating element 26 points uniformly towards at least one adjacent component, or that multiple groups of profilings are provided, the projections and/or cams being provided bundled together in groups for bearing on one or more adjacent components.

In order to improve a ventilating capacity of a brake system is at least one channel, aperture or the like may be provided between the piston 4 and the compensating element 26, and this channel may be provided located at an especially elevated point in the vertical direction in the ultimate installation position in the motor vehicle.

For manufacturing the compensating element 26, it is preferably feasible to form this from a slide bearing material in a manner substantially comparable to a slide bearing bushing. In this case it may be preferable for the compensating element 26 to be able to behave at least to some extent elastically in its fitting or in operation. Multi-material designs and mixed designs of plastic material such as Teflon, in particular, and/or metal material and/or elastomer material such as, in particular, EPDM are furthermore feasible. Here, in principle, an elastic hollow body in the nature of a cylindrical, closed, elastic tube portion may also be feasible. The tube portion preferably has longitudinal ribs arranged regularly spaced on an inner or outer circumference, so that a single compensating element 26 can be used as standard for pistons of different sizes. The inside diameter of the compensating element 26 has a greater tolerance than an outside diameter of the threaded nut. In this context it is also feasible for the compensating element 26 to be provided in the form of a layered multi-material component comprising at least one base material and at least one (elastically compensating) coating material.

According to another variant, the compensating element 26 is formed by substantially chipless shaping from a strip-shaped sheet-metal material having multiple cams 28 arranged regularly or irregularly spaced on the inner and/or outer circumference as a virtually cylindrically rolled insert, largely closed at the circumference, for the piston 4, and may have a wall, which (in cross section) is at least partially non-circular and to some extent folded on multiple sides. The cams 28, longitudinal ribs 29 or other profiling of the compensating element 26 serve to create a thin film of brake fluid, which affords additional damping characteristics. Moreover, all embodiments may have a configuration which allows a completely rotationally fixed placing in the piston 4, for example by providing a polygonal shape (e.g. a hexagon or octagon) on the circumference or tabs 27 in an axial direction Ax for impinging on or meshing in other adjacent components. An overlap 30 of positively interlocking design is provided on the circumference of the insert. The cams 28 are impressed with defined radii in the wall of the compensating element 26. It is possible, by means of the overlap 30, to produce an elastic spring action in a radial direction R, so that the insert can be pretensioned for fixing into the piston 4, in a manner comparable to an elastomer element.

The invention also relates to a piston unit. In principle, this is in three parts and comprises a piston 4, a taper insert 31, which is inserted between the piston 4 and the threaded nut 12, and the compensating element 26. In a preferred design, the functions of the taper insert 31 and the compensating element 26 are provided integrated into one component. As a further variant, it is feasible for a stop/torsion safeguard in the form of a tab 27 to be integrated into said component 26.

Finally, the invention further relates to a compensating element 26 for arrangement in a piston 4.

LIST OF REFERENCE NUMERALS 1 vehicle brake
2 housing
3 piston bore
4 piston
5 friction ring
6 brake disk
7 brake lining
8 brake lining
9 actuator
10 transmission module
11 threaded spindle
12 threaded nut
13 rolling element
14 shaft
15 driver portion
16 means of sealing
17 pressure chamber
18 stub-axle finger
19 stop disk
20 tangential stop
21 axial bearing
22 wrench face
23 axial bearing disk
24 rolling element
25 axial bearing disk
26 compensating element
27 tab
28 cam
29 longitudinal rib
30 overlap/gap
31 taper insert
A axis
L length
O aperture
Ax axial direction
R radial direction

The invention claimed is:

1. An electromechanically actuated vehicle brake having a piston and a spindle-nut-arrangement disposed within the piston, the spindle-nut-arrangement comprising a rotationally fixed nut positioned at least partially within the piston and a driven spindle rotatably received within the nut, the brake further comprising at least one compensating element, which prevents unwanted component oscillations, in a radial direction, the at least one compensating element provided in an area of a coupling between the spindle-nut-arrangement and the piston, the compensating element including a plurality of protrusions that contact a cylindrical inner wall of the piston such that the contact between the protrusions of the compensating element and the cylindrical inner wall of the piston frictionally fixes the compensating element to the piston.

2. The electromechanically actuated vehicle brake as claimed in claim 1, wherein the compensating element is an insert for the piston.

3. The electromechanically actuated vehicle brake as claimed in claim 1, wherein a wall of the piston comprises a mount for the compensating element.

4. The electromechanically actuated vehicle brake as claimed in claim 3, wherein the compensating element is arranged substantially rotationally fixed in the mount, and that at least one torsion safeguard is arranged between the compensating element and the threaded nut.

5. The electromechanically actuated vehicle brake as claimed in claim 1, wherein the compensating element is provided elastically pretensioned between at least two adjacent components.

6. The electromechanically actuated vehicle brake as claimed in claim 1, wherein the compensating element is a spring element.

7. The electromechanically actuated vehicle brake as claimed in claim 1, wherein the compensating element is formed annularly closed, or is a slit cylindrical ring, or is a slit bushing.

8. The electromechanically actuated vehicle brake as claimed in claim 1, wherein the compensating element has at least one of a radially oriented profiling and a radially oriented texturing, and the profiling emerging from the compensating element points uniformly towards at least one adjacent component, and/or that multiple groups of profilings are provided.

9. The electromechanically actuated vehicle brake as claimed in claim 8, wherein the at least one of the radially oriented profiling and the radially oriented texturing are multiple cams being provided bundled together in groups for bearing on one or more adjacent components.

10. The electromechanically actuated vehicle brake as claimed in claim 1, wherein the compensating element is formed so that it is at least partially elastic from at least one of a plastic material, a metal material and an elastomer material.

11. The electromechanically actuated vehicle brake as claimed in claim 10, wherein the plastic material is polytetrafluoroethylene.

12. The electromechanically actuated vehicle brake as claimed in claim 10, wherein the compensating element is provided as a cylindrical tube portion, which has multiple longitudinal ribs arranged spaced on the circumference.

13. The electromechanically actuated vehicle brake as claimed in claim 10, wherein the compensating element is provided as a cylindrical tube portion, which has multiple longitudinal ribs arranged spaced on an inner circumference.

14. The electromechanically actuated vehicle brake as claimed in claim 1, wherein at least one defined gap for improving the ventilating capacity of the vehicle brake is provided between the piston and the compensating element.

15. The electromechanically actuated vehicle brake as claimed in claim 1, wherein the compensating element is substantially embodied as a slide bearing bushing composed of a slide bearing material.

16. The electromechanically actuated vehicle brake as claimed in claim 1, wherein the compensating element is provided in the form of a layered multi-material component comprising at least one base material and comprising at least one elastic coating material.

17. A piston for an electromechanically actuated vehicle brake, the piston comprising at least one compensating element, which prevents unwanted component oscillations, in a radial direction, the at least one compensating element provided in an area of a coupling between a spindle-nut-arrangement and the piston, the compensating element including a plurality of protrusions that contact a cylindrical inner wall of the piston such that the contact between the protrusions of the compensating element and the cylindrical inner wall of the piston frictionally fixes the compensating element to the piston.

18. A compensating element for a piston, the compensating element preventing unwanted component oscillations, in a radial direction, and the compensating element configured to be provided in the area of a coupling between a spindle-nut-arrangement and the piston, the compensating element including a plurality of protrusions configured to contact a cylindrical inner wall of the piston such that the contact between the protrusions of the compensating element and the cylindrical inner wall of the piston frictionally fixes the compensating element to the piston.

* * * * *